United States Patent
Wegmann et al.

(10) Patent No.: US 9,338,720 B2
(45) Date of Patent: May 10, 2016

(54) SELF-ORGANIZED DECENTRALIZED MOBILITY ROBUSTNESS OPTIMIZATION

(75) Inventors: Bernhard Wegmann, Holzkirchen (DE); Ahmad Awada, Munich (DE); Dirk Rose, Munich (DE); Ingo Viering, Munich (DE)

(73) Assignee: Nokia Solution and Networks Oy, Espoo (FI)

( * ) Notice: Subject to any disclaimer, the term of this patent is extended or adjusted under 35 U.S.C. 154(b) by 39 days.

(21) Appl. No.: 13/982,278

(22) PCT Filed: Feb. 28, 2011

(86) PCT No.: PCT/EP2011/052898
§ 371 (c)(1),
(2), (4) Date: Jul. 29, 2013

(87) PCT Pub. No.: WO2012/116723
PCT Pub. Date: Sep. 7, 2012

(65) Prior Publication Data
US 2013/0310046 A1    Nov. 21, 2013

(51) Int. Cl.
*H04W 36/30* (2009.01)
*H04W 36/00* (2009.01)
*H04W 36/24* (2009.01)
*H04W 24/02* (2009.01)

(52) U.S. Cl.
CPC .......... *H04W 36/30* (2013.01); *H04W 36/0083* (2013.01); *H04W 24/02* (2013.01); *H04W 36/0094* (2013.01); *H04W 36/24* (2013.01); *H04W 36/245* (2013.01)

(58) Field of Classification Search
None
See application file for complete search history.

(56) References Cited

U.S. PATENT DOCUMENTS

| 8,559,953 | B2 * | 10/2013 | Maida et al. | 455/436 |
| 2005/0048974 | A1 * | 3/2005 | Kim et al. | 455/436 |
| 2008/0037511 | A1 | 2/2008 | Casati et al. | 370/350 |

(Continued)

FOREIGN PATENT DOCUMENTS

GB    2472595 A    2/2011

OTHER PUBLICATIONS

3GPP TR 36.902 V9.3.0 (Dec. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); 21 Pages.*

(Continued)

*Primary Examiner* — Charles Appiah
*Assistant Examiner* — Margaret G Mastrodonato
(74) *Attorney, Agent, or Firm* — Harrington & Smith (57) ABSTRACT

There is provided a control apparatus for controlling a first cell of a cellular communication network, the control apparatus including a control unit configured for receiving handover related data related to a handover from the first cell to a second cell and a third cell, wherein the control unit is further configured for determining a ranking data for the second cell and the third cell, the ranking data being dependent on the handover related data, and wherein the control unit is further configured for setting at least one operating parameter of the control apparatus depending on the handover related data and the ranking data. Further, the control unit may be configured for determining ranking data for the first cell and a fourth cell, and for determining a value for at least one operating parameter of a control apparatus which controls the second cell.

12 Claims, 3 Drawing Sheets

(56) References Cited

U.S. PATENT DOCUMENTS

| | | | |
|---|---|---|---|
| 2009/0323638 A1* | 12/2009 | Catovic et al. | 370/331 |
| 2012/0028584 A1* | 2/2012 | Zhang et al. | 455/63.1 |
| 2012/0100884 A1* | 4/2012 | Radulescu | H04W 36/0083 455/524 |
| 2012/0276900 A1* | 11/2012 | Stephens | H04W 24/02 455/436 |
| 2013/0115949 A1* | 5/2013 | Centonza | H04W 36/245 455/436 |
| 2014/0087729 A1* | 3/2014 | Olofsson | H04W 36/0083 455/436 |

OTHER PUBLICATIONS

3GPP TR 36.902 V9.3.1 (Mar. 2011); "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)"; 21 pgs.

Ashraf, I. et al.; "Distributed Radio Coverage Optimization in Enterprise Femtocell Networks"; Communications (ICC), 2010 IEEE International Conference on; IEEE, Piscataway, NJ, USA, May 23, 2010; abstract.

* cited by examiner

SELF-ORGANIZED DECENTRALIZED MOBILITY ROBUSTNESS OPTIMIZATION

FIELD OF THE INVENTION

The present invention relates to the field of cellular communication networks.

BACKGROUND OF THE INVENTION

US 2009/0323638 A1 discloses a method and apparatus for automatic handover optimization. An automatic handover manager is provided to analyze and dynamically adjust one or more handover parameters that are employed by the respective base stations to handover or switch control states between base stations provide wireless service to devices. Automatic handover functionality may exist on one or more of the base stations or may be divided amongst the base stations. Also a user equipment can include one or more aspects of automated handover parameter identification, measurement and/or dynamic adjustment. Handover parameters are monitored and dynamically adjusted by the handover manager as conditions dictate or indicate where the parameters impact the timing and hence the quality of efficient handovers between base stations.

However, for large networks the centralized approach with a separate handover apparatus becomes complex in particular when introducing parallelization of optimization tasks among cells.

In view of the above described situation, there exists a need for an improved technique that enables to provide a wireless communication network while avoiding or at least reducing one or more of the above-identified problems.

SUMMARY OF THE INVENTION

This need may be met by the subject matter according to the independent claims. Advantageous embodiments of the herein disclosed subject matter are described by the dependent claims.

According to a first aspect of the herein disclosed subject matter, there is provided a control apparatus for controlling a first cell of a cellular communication network, the control apparatus comprising: a control unit configured for receiving handover related data, the handover related including a) a first cell pair specific data related to at least one already performed handover from the first cell to a second cell; and b) second cell pair specific data related to at least one already performed handover from the first cell to a third cell. The control unit is further configured for determining a ranking data for the second cell and the third cell, the ranking data being dependent on the handover related data. Further, the control unit is configured for setting at least one operating parameter of the control apparatus depending on the handover related data and the ranking data.

This aspect of the herein disclosed subject matter is based on the idea that in a decentralized control of the cellular communication network, wherein the control apparatus for the first cell optimizes one or more of its operating parameters on the basis of information that is available to the control apparatus may be improved by providing for features as disclosed with regard to the first aspect or an embodiment thereof. In particular, receiving cell pair specific data of at least two handovers to a second cell and a third cell, the conflict may arise as to whether the control apparatus should change its operating parameters according to the first cell pair specific data related to handovers from the first cell to the second cell or whether the operating parameters of the control apparatus should be changed according to the second cell pair specific data related to handovers from the first cell to a third cell. According to the first aspect, such a conflict situation can be mitigated by determining ranking data depending on the handover related data and setting the at least one operating parameter of the control apparatus depending on the handover related data as well as on the ranking data.

As specified with regard to the first aspect, the control apparatus is configured for controlling a first cell of a cellular communication network. In an embodiment, the control apparatus is associated with a base station of the cellular communication network. For example, in case of LTE, the control apparatus may be incorporated in the eNodeB which forms a base station of an LTE cell. According to another embodiment, the control apparatus may be provided as a separate apparatus which is however associated to a base station that generates the first cell. For example, for a UMTS cell the control apparatus according to the first aspect may be implemented in a radio network controller (RNC) controlling at least one base station operating according to the UMTS standard.

According to an embodiment, the handover related data includes for example one or more of key performance indicators (KPIs), KPI statistics, etc., or signaling information which allows generating corresponding handover related data. According to an embodiment, the handover related data is handover performance data indicating the performance of already performed handovers from the first cell to one or more other cells, e.g. the second cell and the third cell as described with regard to the first aspect.

According to an embodiment, the ranking data is determined via look-up table from the handover related data wherein in the look-up table certain handover related data ranges are associated with corresponding ranking data. In other embodiments, the ranking data is calculated by using a cost function. The cost function may have as input parameters the handover related data and provides, as a function thereof, the ranking data. According to an embodiment, the cost function may be defined in the control apparatus, for example the cost function may be stored in a storage device of the control apparatus. According to an embodiment, the ranking data indicates a rank of the respective handover related data. In particular, in an embodiment, for each cell pair a rank of this cell pair is determined on the basis of the handover data, the rank of the cell pair indicating the quality of a handover from the first cell to the other cell of the cell pair are. The quality of a handover may indicate e.g. how severe problems of a handover are. Typically, the quality handover is determined by key performance indicators as described herein. According to an embodiment, the ranking data is performance ranking data, i.e. ranking data that is related to the handover performance of the respective control apparatus.

As mentioned above, in an embodiment, the control apparatus is a base station of the cellular communication network or is associated with a base station of the cellular communication network. For example, the base station may use a particular radio access technology (RAT), e.g. LTE or UMTS (LTE=Third Generation Partnership Project (3GPP) Long-Term Evolution; UMTS=3GPP Universal Mobile Telecommunication System). However, it should be understood that these radio access technologies are only examples and that any other radio access may be implemented so as to incorporate aspects and embodiments of the herein disclosed subject matter.

The term interface as used herein may relate to a physical interface or to a logical interface, in respective embodiments.

For example, in an embodiment the interface may be an x2 interface as defined in LTE. According to another embodiment, the interface may be implemented by radio access information management (RIM).

According to an embodiment, the cell-related data are cell pair related data being related to both, the first cell and the second cell. For example, optimization of mobility parameters usually involves optimization of mobility parameters on the basis of cell pair related data which are related to the cells between which a handover occurs.

While unidirectional exchange of cell pair related data is implemented in some embodiments, it should be understood that usually the cell pair related data is exchanged bidirectionally between the related control apparatuses, e.g. the first control apparatus and a further control apparatus that controls e.g. the second cell or the third cell.

According to an embodiment, the handover related data includes cell pair specific information and optionally cell-specific information. For example, in an embodiment, the handover related data includes or consists of at least one of information for mobility robustness optimization; cell pair related performance and control information; key performance indicators (KPI); KPI statistics; performance ranking data; mobility robustness control indications; etc.

According to a further embodiment, the control unit is further configured for receiving feedback data related to a handover from the first cell to the second cell and a handover from the first cell to the third cell; and is further configured for determining the handover data on the basis of the feedback data. For example, in an embodiment the further cell (second cell or third cell) to which the handover has been performed sends a feedback message to the first control apparatus, wherein the feedback data included in the feedback message indicate to the first control apparatus key performance indicators of the handover. Key performance indicators may indicate for example whether the handover was successful or not, whether the handover was too late, whether the handover was too early, whether the handover was made to the wrong cell, whether the further cell handed over the user equipment after a short time to another cell (short stay), ping pong to same cell, ping pong to different cell etc. Herein, ping pong to same cell (PP same cell) means that immediately after successful inter-RAT handover from a source cell of a first radio access technology (first RAT) to a cell of a second, different RAT the user equipment is handed over back to the source cell of the first RAT. Further, ping pong to different cell (PP different cell) means that immediately after successful inter-RAT handover from a source cell of a first RAT the user equipment is handed over back to the first RAT, however to a cell different from the source cell.

According to a further embodiment, the control apparatus comprises a storage device and the control unit is further configured for storing the handover related data in the storage device. For example, a statistics may be built continuously on receiving feedback data and calculating the handover related data on the basis of the previous handover related data and the feedback data. According to another embodiment, the feedback data may be stored in the storage device and the control unit may be configured for determining the handover related data from the stored feedback data. For example, the handover related data may be provided in certain time intervals or upon trigger events.

According to a further embodiment, the data processing unit is configured for receiving cell pair specific data for at least two further cells of which each cell pair includes the first cell and the further cell out of the plurality of cells of the communication network, and wherein the data processing unit is further configured for selecting one of the further cells as a selected cell, the feedback data of which forms the basis for setting the at least one operating parameter of the first cell. For example, such a selected cell may have associated therewith ranking data in the form of a high cost value. Generally herein, handover related data may include a at least one key performance indicator, at least one key performance indicator statistics, at least one cost value, at least one cost information or at least one intended parameter update of a cell together with an identifier of this cell. The at least one intended parameter update, e.g. the setting of the at least one operating parameter intrinsically includes ranking information: The more an operating parameter is changed, the higher is the necessity (i.e. the rank) of this change. According to an embodiment, the handover related data, e.g. the cost information or cost value, indicates the actual performance of the respective cell.

According to an embodiment, handover related data is used by the control unit of the control apparatus of the first cell to determine the ranking data of cell pairs which include the first cell and a further, target cell. Such handover related data is also referred to as handover related base data. In a further embodiment, this handover related base data is forwarded together with the ranking data a cell pair identifier to a control apparatus of a further cell. In another embodiment, only the ranking data and the cell pair identifier are forwarded to the control apparatus of the further cell. The cell pair identifier allows the control unit of the further cell to determine which cells are included in the cell pair to which the handover related base data and/or the ranking data belongs.

According to a second aspect of the herein disclosed subject matter, a control apparatus for controlling a first cell of a cellular communication network is provided, the control apparatus comprising a control unit configured for receiving handover related data, the handover related data including a) first cell pair specific data related to at least one already performed handover from a second cell to the first cell and; b) second cell pair specific data related to at least one already performed handover from the second cell to the third cell. The control unit is further configured for determining ranking data for the first cell and the third cell from the handover related data. The control unit is further configured for determining, depending on the handover related data and the ranking data, a value for at least one operating parameter of a second control apparatus controlling the second cell.

The second aspect of the herein disclosed subject matter addresses an optimizing conflict that may occur in a decentrally controlled cellular communication network, where a first handover occurs from a second cell to the first cell and a second handover occurs from the second cell to the third cell. Without conflict resolution according to the second aspect, the first cell and the third cell may provide, in response to the handover, feedback messages, e.g. including the handover key performance indicators, to the second cell. However, then the situation may occur where the control apparatus of the first cell feeds back first feedback data indicating a first configuration of the operating parameters of the second control apparatus and wherein the control apparatus of the third cell feeds back second feedback data suggesting a second configuration of the at least one operating parameter of the second control apparatus, wherein the first configuration and the second configuration for the at least one operating parameter differ from each other.

The second aspect of the herein disclosed subject matter mitigates such a conflict by receiving the second cell pair specific data which is related to the at least one already performed handover from the second cell to the third cell, determining ranking data for the first cell as well as for the third cell and by determining depending on the handover data and the ranking data for the first cell as well as for the third cell the at least one operating parameter value for the at least one operating parameter of the second control apparatus.

It should be noted that the numbering of the cells and the control apparatuses are provided only for identification of the different cells or apparatuses and should not be considered as limiting the described subject matter. For example, in an embodiment, a control apparatus may include features of the first aspect and features of the second aspect or embodiments thereof. In such a case, the third cell of the second aspect may be referred to as fourth cell in order to provide a unique numbering for all cells involved.

According to an embodiment, the control unit is configured for providing the value for the at least one operating parameter to the second control apparatus. For example, the control unit may be configured for forwarding the value for the at least one operating parameter to the second control apparatus.

According to a further embodiment, the control apparatus comprises a storage device and the control unit is configured for receiving the first cell pair specific data from the storage device. There are several possibilities for determining and storing the first cell pair specific data in the storage device. For example, according to an embodiment, the control unit is configured for determining the first cell pair specific data from data related to the at least one handover from the second cell to the first cell. Further, the control unit may be configured for storing the first cell pair specific data in the storage device. Hence, in such embodiments, the control apparatus of the first cell is configured for determining handover related data on the basis of handovers to the first cell. Such handover related data (first cell pair specific data) may include handover performance data, such as key performance indicators or key performance indicator statistics.

According to a further embodiment, the control unit is configured for receiving the second cell pair specific data from a control apparatus controlling the third cell. For example, according to an embodiment, the control apparatus of the first cell and the control apparatus of the third cell both include an interface for direct communication of the control apparatuses. For example, in an embodiment where the first cell and the third cell are LTE cells, such an interface may be the x2 interface defined in the LTE standard.

According to an embodiment, the second cell pair specific data includes (or, in another embodiment consists of) the ranking data of the third cell and a cell pair identifier identifying the second cell and the third cell. While such an embodiment of the second cell pair specific data does not provide the full information known to the control apparatus of the third cell, it however includes sufficient information for resolution of the conflict identified above with regard to the second aspect. In other embodiments, the full information is distributed among a group of control apparatuses of the cellular communication network. Also in such an embodiment, where the second cell pair specific data includes the ranking data of the third cell (or the ranking data of the cell pair consisting of the third cell and the second cell), the ranking data may include or consist of a proposed value for the at least one operating parameter (which is referred to as second proposed value set) of the second control apparatus as proposed by the third cell. Accordingly, the first control apparatus may also receive, as the first cell pair specific data, a proposed value for the at least one operating parameter (which is referred to as first proposed value set) of the second control apparatus. In such an embodiment, the control unit of the first control apparatus is configured for determining the value for the at least one operating parameter of the second control apparatus by selecting out of the first proposed value set and the second proposed value set the value set with the highest rank. The rank of the value set may be determined from the respective value set itself, e.g. from the changes performed by the value set compared with the present setting. However, the rank may be determined in accordance with any further embodiment disclosed herein.

According to a further embodiment, the first cell and the second cell are operated with different radio access technologies. For example, in an embodiment the first cell (and, in a further embodiment also the third cell) is operated with an LTE technology, whereas the second cell is operated with an UMTS technology. In such a case the group of control apparatuses may e.g. be formed by all control apparatuses using the same radio access technology (RAT), e.g. all control apparatuses using LTE.

In particular the conflict solving approach provided by the second aspect allows for the rollout of a new technology, e.g. LTE, implemented in the control apparatus of the first cell and the control apparatus of the third cell while still maintaining control apparatuses of another radio access technology, e.g. older radio access technology without requiring increased processing capabilities of the control apparatus of the second cell. In particular, since the control apparatus of the second cell does not have to determine adapted operating parameters by itself, according to an embodiment the control apparatus of the second cell is configured only for receiving such adapted operating parameters from one of the control apparatuses which operate with the first radio access technology. Hence, implementation of embodiments of the herein disclosed subject matter can easily performed on such already existing control apparatuses. Hence, embodiments of the herein disclosed subject matter provide for an efficient upgrade of existing radio access technologies towards self-optimizing networks.

According to a further embodiment, the at least one operating parameter includes at least one mobility parameter. For example with regard to the first or the second aspect, the at least one mobility parameter defines a condition, at which a handover to a further cell is initiated by the control apparatus having set the mobility parameter. For example, in case of the second aspect, the at least one mobility parameter defines a condition for which a handover to a further cell is initiated by the control apparatus of the second cell.

According to a third aspect of the herein disclosed subject matter, a method of operating a control apparatus controlling a first cell of a cellular communication network is provided, the method comprising receiving handover related data, the handover related data including a) first cell pair specific data related to at least one already performed handover from the first cell to a second cell and b) second cell pair specific data related to at least one already performed handover from the first cell to a third cell. Further, the method includes determining ranking data for the second cell and ranking data for the third cell, the ranking data being dependent on the handover related data. Further, the method includes setting at least one operating parameter of the control apparatus of the first cell depending on the handover related data and the ranking data.

The method according to the third aspect of the herein disclosed subject matter may be performed by the control apparatus as defined with regard to the first aspect, without being limited hereto. However, embodiments of the third aspect include respective features as described with regard to the first aspect or, where applicable, defined with regard to the second aspect.

According to a fourth aspect of the herein disclosed subject matter, a method of operating a first control apparatus controlling a first cell of a cellular communication network is provided, the method comprising receiving handover related data, the handover related data including a) cell pair specific data related to at least one already performed handover from a second cell to the first cell and b) cell pair specific data related to at least one already performed handover from the second cell to a third cell. Further, the method comprises determining ranking data for the first cell and the third cell from the handover related data and, depending on the handover related data and the ranking data, determining a value for at least one operating parameter of a second control apparatus controlling the second cell.

The method according to the fourth aspect of the herein disclosed subject matter may be carried out by the control apparatus as defined with regard to the second aspect of the herein disclosed subject matter or embodiments thereof, without being limited hereto. However, embodiments of the fourth aspect include respective features of embodiments of the second aspect and, where applicable, of the first aspect.

For example, according to an embodiment of the method defined with regard to the third aspect or the fourth aspect, the first cell and the second cell are operated with different radio access technologies.

According to a further embodiment, the at least one operating parameter includes at least one mobility parameter as further defined with regard to the second aspect. However, it should be understood that the at least one operating parameter referred to in the first aspect, the third aspect or the fourth aspect also may include at least one respective mobility parameter. For example, having regard to the first aspect, the at least one mobility parameter defines a condition for which a handover to a further cell is initiated by the control apparatus of the first cell.

According to a fifth aspect of the herein disclosed subject matter, a computer program is provided, the computer program being adapted for, when being executed by a data processor device, controlling the method as set forth in the third aspect and/or the fourth aspect or at least one embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

In the above there have been described and in the following there will be described exemplary embodiments of the subject matter disclosed herein with reference to a control apparatus and a respective method. It has to be pointed out that of course any combination of features relating to different aspects of the herein disclosed subject matter is also possible. For example, some embodiments have been or will be described with reference to a control apparatus in accordance with the first aspect or an embodiment thereof whereas other embodiments have been described with reference to a control apparatus according to the second aspect or an embodiment thereof. Further, some embodiments have been described with regard to apparatus type features whereas other embodiments have been described with regard to method type features. However, a skilled person will gather from the above and the following description that, unless otherwise notified, in addition to any combination of features belonging to one aspect also any combination between features relating to different aspects or embodiments, for example even between features of apparatus type embodiments and features of method type embodiments is considered to be disclosed with this application. The aspects and embodiments defined above and further aspects and embodiments of the herein disclosed subject matter are apparent from the examples to be described hereinafter and are explained with reference to the drawings but to which the invention is not limited.

DETAILED DESCRIPTION

The illustration in the drawings is schematic. It is noted that in different figures, similar or identical elements are provided with the same reference signs or with reference signs which are different from the corresponding reference signs only within the first digit or an appended character.

The technical field of embodiments of the herein disclosed subject matter is mobile radio communications where a plurality of different radio access techniques (RATs) are operated as one unified network with overlaying radio access networks. One embodiment of the herein disclosed subject matter focuses on mobility robustness optimization (MRO) for both intra-RAT and inter-RAT mobility. Such use cases include self-optimization of the cellular communication network.

Figure 1:
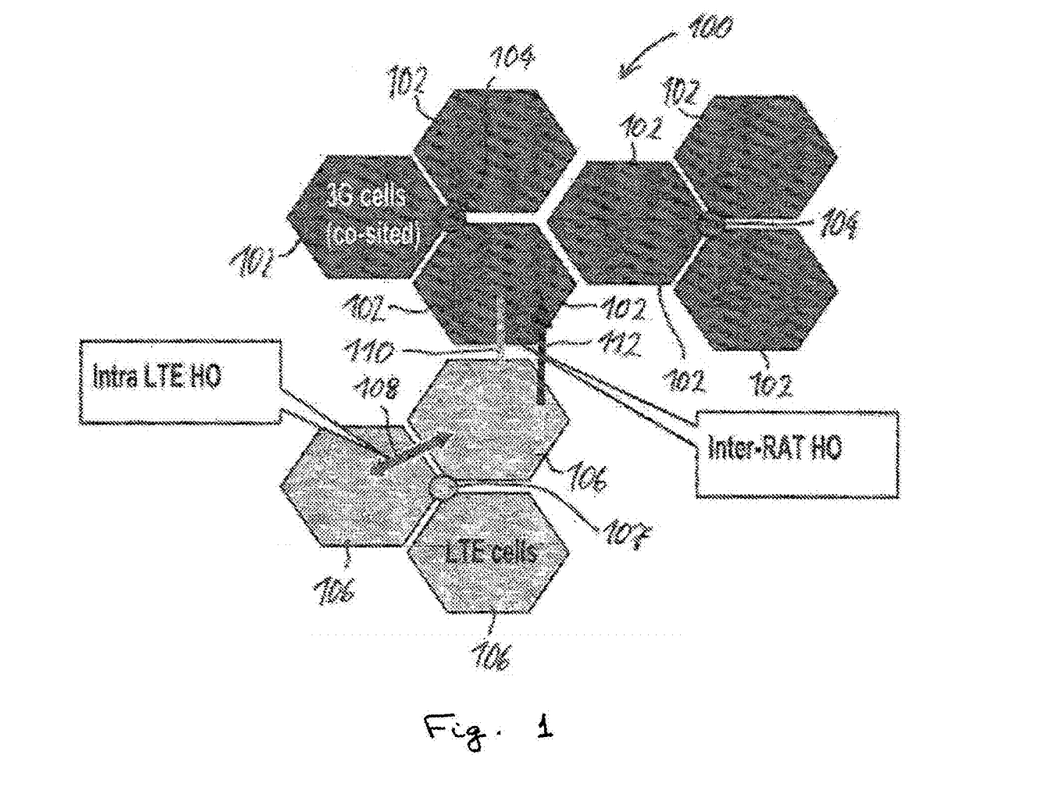
FIG. 1 shows a cellular communication network in accordance with embodiments of the herein disclosed subject matter.

FIG. 1 shows a cellular communication network 100 in accordance with embodiments of the herein disclosed subject matter. In particular FIG. 1 shows different mobility use cases in a multi-RAT communication network. The cellular communication network 100 of FIG. 1 includes two groups of cells, a first group of cells 102 which use a first radio access technology, universal mobile telecommunications system (UMTS) in the shown example. Further shown are two control apparatuses 104, each of which is configured for controlling three cells 102. Further shown in FIG. 1 are cells 106 of a further group of cells which operate with a second radio access technology which is different from the first radio access technology. In an illustrative embodiment, the cells 106 operate according to the LTE radio access technology. The cells 106 of the second radio access technology are controlled by respective control apparatuses 107, one of which is shown in FIG. 1.

Traditional radio network planning means are based on static network performance evaluation without considering a user mobility. The intra-RAT intrafrequency mobility, which is also referred to as "horizontal" user equipment handover between spatially adjacent cells mainly suffers from intercell interference at the cell border in contrast to the interfrequency and inter-RAT mobility use case. Moreover, inter-RAT mobility is predominantly underlying traffic steering policies which may change from time to time and therefore radio-related parameters of the considered radio access technologies need to be adapted and aligned accordingly. A common default mobility parameter setting configured during the planning phase may be not appropriate for any future time since radio and traffic properties differ from cell to cell and from radio access technology to radio access technology and, therefore, may require a cell-specific or even cell pair specific parameter configuration for optimal network operation. Known architectures of self-organized mobility parameter optimization of a cellular communication network use a centralized concept, where one central unit collects the performance data of the cells, evaluates the data by taking into account all interdependencies of the cells and steers the update of the mobility parameter of a dedicated cell.

In contrast hereto, embodiments of the herein disclosed subject matter relate to a decentralized control concept, wherein each node collects its own performance data (e.g. key performance indicators, ranking data, etc) and adjusts mobility parameters of the cells under control in self-contained manner. FIG. 1 shows two general handover events that may occur in a multi-radio access technology network. A first handover type is an intra-RAT handover, generally indicated at 108 in FIG. 1. A second handover type, i.e. an inter-RAT handover is indicated at 110 and 112 in FIG. 1. For example, indicated at 110 is a handover from a UMTS cell 102 to an LTE cell 106. Further, the arrow in the opposite direction, indicated at 112, represents a handover from an LTE cell 106 to a UMTS cell 102.

However, implementation of a decentralized control concept is not a straightforward task and is involved with several problems which are addressed by embodiments of the herein disclosed subject matter. One problem being addressed by the herein disclosed subject matter is the fact that the adjustment of mobility parameters concerns cell pairs, i.e. the two cells between a user equipment (UE) is handed over. Each cell normally has several neighbours to which handovers are occurring and, therefore, cell pair specific mobility parameter analysis (e.g. cell pair specific mobility key performance indicator analysis) and/or cell pair specific performance evaluation is necessary in some embodiments. A cell pair specific performance evaluation and hence providing respective ranking data for the respective cell pair may be based for instance on a cost function or a look-up table as described herein, or on any other suitable concept.

One problem of a decentralized approach may be that it cannot be guaranteed that two cells of the considered mobility-related cell pair have the same knowledge with respect to the mobility key performance indicators. A second problem that may arise is that the decentralized operation needs to be coordinated in order to avoid conflicts, e.g. to avoid optimization of a common neighbour by two different cell pairs, in particular in an inter-RAT use case.

Hence, embodiments of the herein disclosed subject matter perform a bidirectional mobility performance analysis of a cell pair and a respective exchange of information, in particular cell pair specific KPI statistics and/or cell pair specific performance ranking data e.g. a cost function or cost function values, between the respective control apparatuses of the cells. It should be mentioned, that mobility robustness optimization is already taken into account in 3GPP (Third Generation Partnership Project) standardization, e.g. 3GPP TR 36.902: "Evolved Universal Terrestrial Radio Access Network (E-UTRAN); self-configuring and self-optimizing network use cases and solutions". However, present solutions are dealing with the root cause analysis part of the intra-LTE only. However, it should be understood that handover related failures as described in the above referenced document may also be used and be taken into account in the context of the herein disclosed subject matter.

Having now regard to a decentralized mobility robustness optimization algorithm which may include aspects and embodiments of the herein disclosed subject matter, a description of illustrative use cases is provided. For example, according to an embodiment an exchange of cell pair specific or cell pair related performance and control information or performance and control information statistics and/or cell pair specific performance ranking data and/or MRO control indications between control apparatuses of the cellular communication network is provided. Generally herein and in the following, the term control apparatus relates to a control apparatus for controlling at least one cell of a cellular communication network.

Figure 2:
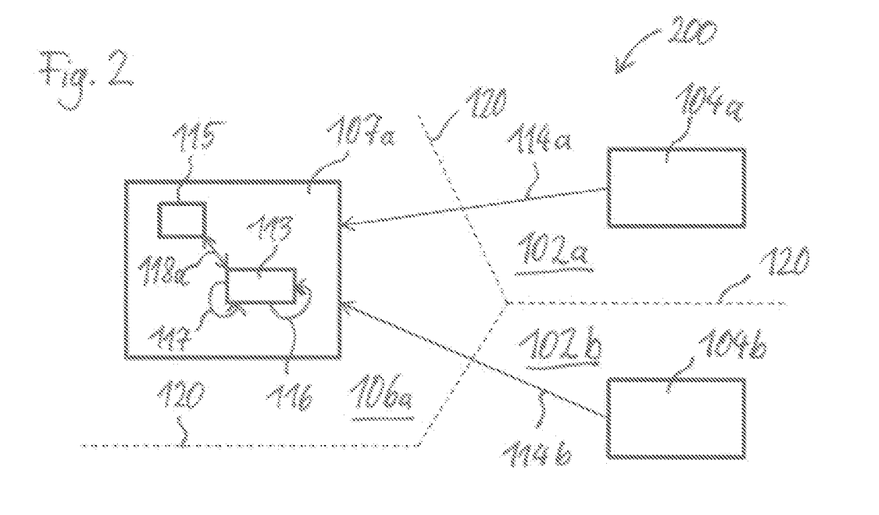
FIG. 2 schematically shows in part a cellular communication network in accordance with embodiments of the herein disclosed subject matter.

FIG. 2 schematically shows in part a cellular communication network 200 in accordance with embodiments of the herein disclosed subject matter. The cellular communication network 200 comprises a first cell 106a which is controlled by a first control apparatus 107a. Further, the communication network 200 comprises a second cell 102a which is controlled by a second control apparatus 104a. Further, the communication network 200 comprises a third cell 102b which is controlled by a third control apparatus 104b. The dashed line 120 serves to indicate a cell boundary between the first cell 106a, the second cell 102a and the third cell 102b.

In accordance with an embodiment, the control apparatus 107a of the first cell 106a comprises a control unit 113 which is configured for receiving feedback data 114a, 114b related to a handover from the first cell to the second cell or to the third cell. For example, as shown in FIG. 2, the control unit may receive feedback data from two or more further cells i.e. first feedback data 114a from the control apparatus 104a of the second cell 102a and a second feedback data 114b from the control apparatus 104b of the third cell 102b. The control unit 113 is further configured for determining handover related data 118a, e.g. key performance indicator statistics on the basis of the feedback data 114a, 114b. In accordance with an embodiment, the control apparatus 107a of the first cell further comprises a storage device 115, wherein the control unit 113 is configured for storing the handover related data 118a in the storage device 115.

The stored handover related data 118a may then be received by the control unit 113 in accordance with embodiments of the herein disclosed subject matter. For example, in accordance with an embodiment, the control unit 113 is configured for receiving the handover related data 118a from the storage device 115. In accordance with an embodiment, the handover related data includes first cell pair specific data related to at least one already performed handover (not shown in FIG. 2) from the first cell 106a to the second cell 102a. Further, the handover related data includes second cell pair specific data related to at least one already performed handover (not shown in FIG. 2) from the first cell 106a to the third cell 102b.

In order to solve the problem of for example competing updates of operating parameters of the control apparatus 107a, the control unit 115 is configured for determining ranking data 116 for the second cell and the third cell, wherein the ranking data 116 are dependent on (e.g. determined from) the handover related data 118a. In accordance with exemplary embodiments described with regard to the drawings, the rank indicated by the ranking data is the higher, the severe handover problems are for a specific cell pair. In other words, the lower the handover performance, the higher the rank indicated by the ranking information. For example, in an embodiment, if the first cell pair specific data indicate that the percentage of too late handovers from the first cell to the second cell is 10% and the second cell pair specific data indicates that a percentage of too late handovers from the first cell to the third cell is about 15%, the control unit, in an embodiment, is configured for setting the at least one operating parameter of the control apparatus 107a so as to reduce the rate of too late handovers from the first cell to the third cell. Although this may cause the percentage of too late handovers from the first cell to the second cell to rise, it should be understood that with a suitable update rate with which the operating parameters of the control apparatus 107a are updated may result in an optimized operating parameter set. Further, it should be understood that the key performance indicator of too late handovers is described only exemplary and that an arbitrary set of key performance indicators may be used to determine the change of the operating parameters of the control apparatus. For example, in an embodiment, a cost function may be defined which takes into account two or more key performance indicators. Further, the cost function may take into account not only the cell pair specific data of a particular cell but may takes into account cell pair specific data of two or more cells. For instance, the cost function may take into account cell pair specific data of all cells from which the control apparatus of the first cell receives feedback data. The setting of the at least one operating parameter of the control apparatus 107a to a determined value (set-point value) is indicated at 117 in FIG. 2.

Figure 3:
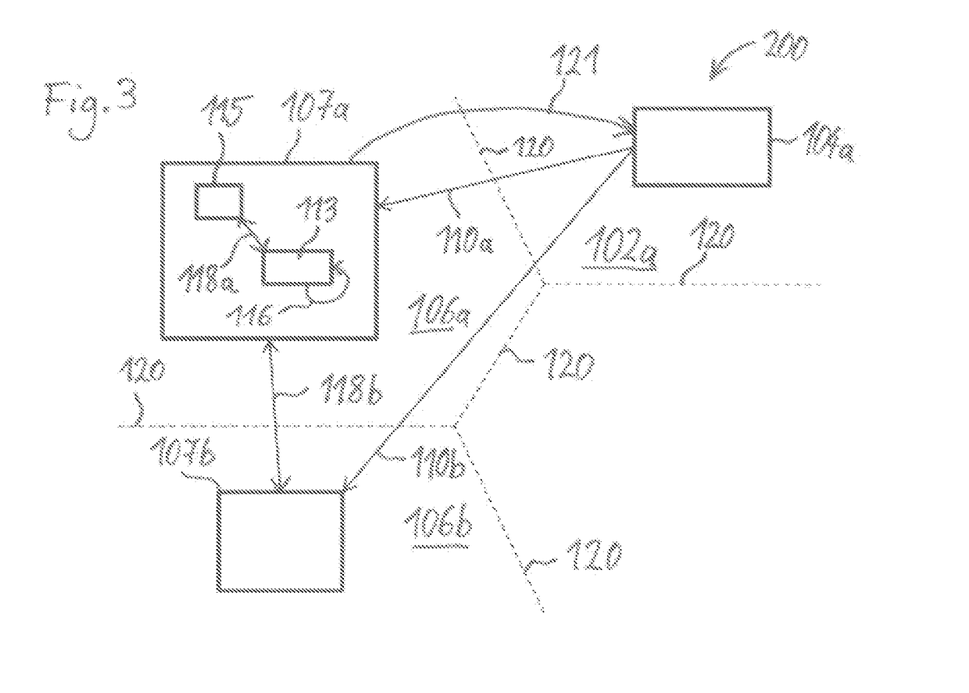
FIG. 3 shows a further part of the cellular communication network of FIG. 2, in accordance with embodiments of the herein disclosed subject matter.

FIG. 3 shows a further part of the cellular communication network 200 of FIG. 2, in accordance with embodiments of the herein disclosed subject matter. Elements which have been already described with regard to FIG. 2 are associated with the same reference signs and the description is not repeated here.

Shown in FIG. 3 are the first cell 106a which is controlled by the first control apparatus 107a and the second cell 102a which is controlled by the second control apparatus 104a. Further shown in FIG. 3 is a fourth cell 106b which is controlled by a fourth control apparatus 107b.

In accordance with an embodiment, the control apparatus 107a of the first cell comprises the control unit 113 configured for receiving handover related data 118a, 118b, wherein the handover related data includes a first cell pair specific data 118a related to at least one already performed handover from the second cell 102a to the first cell 106a. Further, the handover related data includes a second cell pair specific data 118b which is related to at least one already performed handover from the second cell 102a to the fourth cell 106b. The control unit 113 is further configured for determining ranking data 116 for the first cell 106a and the fourth cell 106b from the handover related data 118a, 118b. Further, the control unit 113 is configured for determining, depending on a handover related data 118a, 118b and the ranking data 116 a value 121 for at least one operating parameter of the second control apparatus 104a.

In accordance with an embodiment, the control apparatus 107a comprises the storage device 115 and the control unit 113 is configured for receiving the first cell pair specific data 118a from the storage device 115. The first cell pair specific data may be determined and stored in the storage device 115 in various ways. For example, according to an embodiment, the control unit 113 is configured for determining the first cell pair specific data 118a from data related to at least one handover 110a from the second cell 102a to the first cell 106a. For example, if a user equipment is handed over from the second cell 102a to the first cell 106a, the control unit 113 determines key performance indicators of this handover 110a, for example whether the handover 110a was too late, too early, to the wrong cell, etc. From such data (key performance indicators), statistical data may be determined. For example, in accordance with an embodiment, the control unit 113 is configured for determining key performance indicator statistics and storing the key performance indicator statistics as the first cell pair specific data 118a in the storage device 115.

In accordance with an embodiment, the control apparatus 107b of the fourth cell 106b is configured for determining the second cell pair specific data 118b from at least one handover 110b from the second cell 102a to the fourth cell 106b in the same manner as the first cell pair specific data 118a are determined by the control apparatus 107a of the first cell 106a and the description thereof is not repeated here. In accordance with an embodiment, the second cell pair specific data 118b includes the ranking data (not shown in FIG. 3) of the fourth cell 106b and a cell pair identifier identifying the second cell 102a and the fourth cell 106b.

In accordance with an embodiment, the control unit 107a is configured for receiving the second cell pair specific data 118b from the control apparatus 107b controlling the fourth cell 106b. To this end, an interface may be provided which allows for direct communication of control apparatuses. For example, in an exemplary embodiment, where the control apparatuses 107a, 107b of the first cell 106a and the fourth cell 106b are operated with an LTE technology, the interface may be an x2 interface.

In accordance with an embodiment, the second control apparatus 104a is operated with a radio access technology different from the radio access technology with which the first control apparatus 107a operates. Hence, in such a case, the handovers from the second cell to the first cell, indicated at 110a in FIG. 3, is an inter-RAT handover. Similarly, a handover from the second cell 102a to the fourth cell 106b, indicated at 110b, is also an inter-RAT handover.

In response to the handover related data 118a, 118b and the ranking data 116, the control unit 113 determines the value 121 for at least one operating parameter of the second control apparatus. In accordance with an embodiment, the at least one operating parameter value 121 thus determined is provided to the second control apparatus 104a, e.g. by a configuration message. In response to the at least one operating parameter value 121, the second control apparatus 104a sets its respective operating parameters to the at least one operating parameter value 121 received from the first control apparatus 107a.

According to an embodiment, the control apparatuses 107a, 107b of one radio access technology maintain each other on the same information level, i.e. by means of exchange of second cell pair specific data among the control apparatuses 107a, 107b these control apparatuses have the same knowledge. According to other embodiments, only conflict resolving information is exchanged between the control apparatuses 107a, 107b. For example, in an embodiment, the conflict resolving information includes the cell identities of the involved cell pair and a corresponding cell pair specific data and/or the ranking data corresponding to the second cell pair specific data. This allows each control apparatus to determine whether the own cell pair specific data has the highest rank or whether the cell pair specific data of other control apparatuses have a higher rank. Having regard to a cell pair with a source cell and a target cell between which a user equipment is handed over from the source cell to the target cell, according to a further embodiment, for each source cell of a handover only the cell pair identifier and the ranking information of the cell pair that has the highest rank is forwarded to another control apparatus as second cell pair specific data. In accordance with an embodiment, only the control apparatus which has determined the highest ranking cell pair specific data determines an updated operating parameter value set, i.e. the at least one operating parameter value 121, for the second control apparatus 104a.

For an intra-LTE mobility robustness optimization (MRO) use case the information about the KPI statistics may be exchanged via X2 interface as described above, while for the inter-RAT MRO use case some of this information needs to be exchanged via other means, e.g. via RAN Information Management (RIM).

Having regard to FIGS. 2 and 3, it should be understood that the described radio access technologies (UMTS and LTE) are only exemplary and that the teachings disclosed herein can easily applied to other radio access technologies. Further, in another embodiment the cells 102a, 102b, 106a, 106b may employ the same RAT, i.e. the first RAT and the second RAT may be the same. For example, in an embodiment the cells 102a, 102b, 106a, 106b are all UMTS cells only part of which (106a, 106b) are provided with the capability of determining operating parameter values as described herein.

Figure 4:
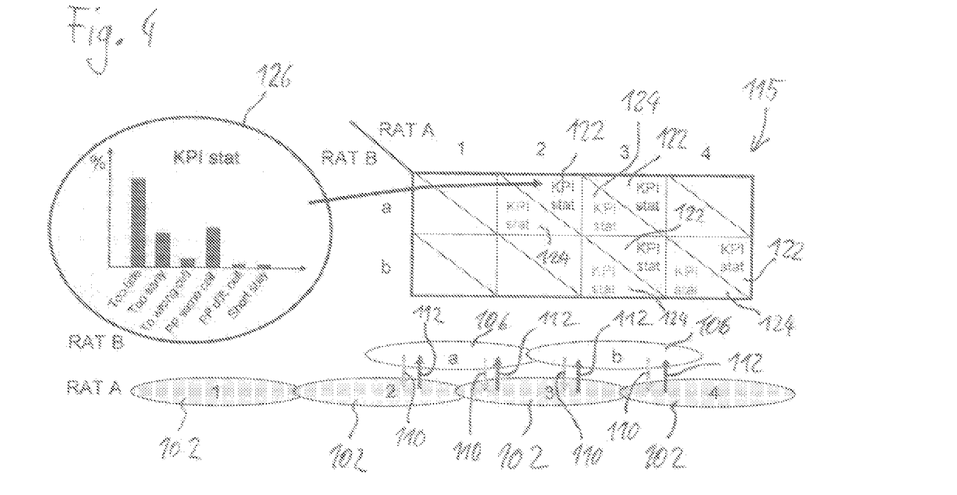
FIG. 4 illustrates determination of inter-RAT cell pair statistics in accordance with embodiments of the herein disclosed subject matter.

FIG. 4 illustrates determination of inter-RAT cell pair statistics in accordance with embodiments of the herein disclosed subject matter. Herein, RAT A cells 102 are labeled 1, 2, 3, 4 and RAT B cells 106 are labeled a and b. In an exemplary embodiment, RAT A cells are LTE cells and RAT B cells are UMTS cells. In accordance with an embodiment, the RAT A cells store KPI information 122 related to handovers 112 from RAT A to RAT B in the storage device 115 of the respective control apparatus. Further, the RAT A cells store KPI information 124 related to handovers 110 from RAT B to RAT A. At 126 there is indicated the statistics of some exemplary key performance indicators (KPI).

For the inter-RAT MRO use case, according to an embodiment the cell pair specific KPI statistics is determined based on the root cause analysis procedure that is described in 3GPP TR 36.902. For instance, according to an embodiment, such cell pair specific KPI statistics (KPI stat) are built and collected in one of the two related radio access nodes (node of either RAT A or RAT B).

If it can be guaranteed that one node of the considered inter-RAT cell pair is completely aware of its KPI statistics, only conflict resolving information (e.g. ranking information and the respective cell pair identifier) has to be exchanged between the nodes rendering the MRO algorithm, for instance between LTE eNBs via X2.

An illustrative embodiment is provided for a multi-RAT network consisting of LTE and UMTS, and it is assumed that the LTE cells are collecting the cell pair specific inter-RAT KPI statistics and computing the cell pair specific performance ranking data, here, in accordance with an embodiment, named cost function (CF) in the following. Hence, for this example the MRO algorithm is accomplished on LTE side. But it should be noted that it can be also accomplished on UMTS side or even distributed among the two nodes even though the distributed alternative requires additional information exchange between the nodes.

It should be understood that the cost function information which will be exchanged as well as the KPI statistics from where it is derived need to be precisely specified and standardized in case of multi-vendor operation.

Figure 5:
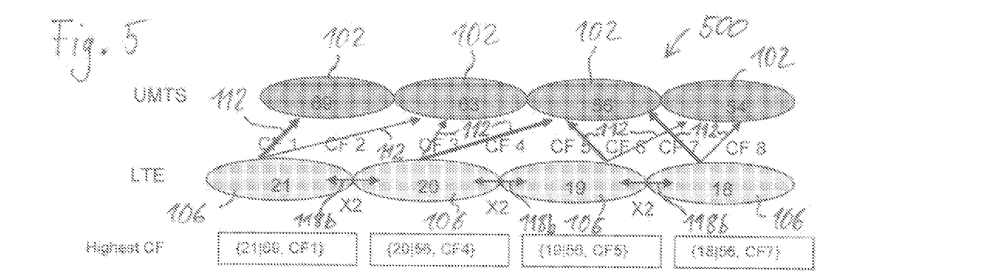
FIG. 5 shows exemplary an overlaid LTE and UMTS network 500 in accordance with embodiments of the herein disclosed subject matter.

FIG. 5 shows exemplary an overlaid LTE and UMTS network 500 in accordance with embodiments of the herein disclosed subject matter. Hence, the exemplary cellular communication network 500 comprises UMTS cells 102 and LTE cells 106. In the cellular communication network 500 each cell might have several inter-RAT neighbor relationships. A neighbor relation corresponds to an inter-RAT cell pair where an inter-RAT handover 112 has occurred and KPI statistics have been built. As each cell pair is to be optimized separately a dedicated cost function (CF 1, CF 2, CF 3, CF 4, CF 5, CF 6, CF 7, CF 8) is specified for each cell pair (21|69; 21|63; 20|63; 20|56; 19|56; 19|54; 18|56; 18|54) as well. For instance, CF 1 is the cost function for the pair {LTE-cell 21; UMTS-cell 69}, etc. Herein, the numbers 21 and 69 are the respective cell identifiers which together form the cell pair identifier {21|69}. In the exemplary embodiment shown in FIG. 5, the cost functions are associated to the cell pairs as follows: (21|69: CF 1; 21|63: CF 2; 20|63: CF 3; 20|56: CF 4; 19|56: CF 5; 19|54: CF 6; 18|56: CF 7; 18|54: CF 8). For each source cell 21, 20, 19, 18 FIG. 5 indicates the cell pair with the highest cost function and the respective cell identifier. For example, for the source cell 21, i.e. the cell from which handovers 112 have been performed to cells 69 and 63, the cell pair is with the highest cost function (or highest cost function value) is the cell pair 21|69 which has associated therewith the cost function CF 1. Further shown in FIG. 5 is the exchange of cost functions (or cost function values in another embodiment) together with the associated cell pair identifiers via the X2 interface of the control apparatuses of the LTE cells 106. This exchange via the X2 interface is indicated at 118b in FIG. 5.

The advantage of a distributed MRO algorithm is that it can run simultaneously in various nodes (i.e. parallelization of the operation) as long as there is no conflict. Typical conflict situation would result either when one cell has two or more neighbor relationships. Here for the example in FIG. 5, cell 21 is building a cell pair with UMTS cells 69 and 63 and, therefore, owns two CFs as well. Parallel optimization of CF1 and CF2 would a conflict, since both try to manipulate HO parameters of cell 21. Another conflict situation occurs when several LTE cells are related to one and the same UMTS cell, for instance UMTS cell 56, which is related to 3 LTE cells (18, 19, 20) in our example.

In order to avoid such conflicts, simultaneous optimization of inter-related cell pairs as described above has to be prevented and, therefore, coordination between these nodes running the MRO algorithm becomes necessary. In case of LTE, the coordination is handled by exchanging the cost functions belonging to the cell pair KPI statistics via X2. (For UMTS, the RNC is the responsible node which is already carrying information of the controlled nodeBs. Potentially, information exchange between RNCs via Iur-I/F interface may be needed.) The less cell pairs are inter-related the better the parallelization benefit.

One proposed procedure to resolve these conflicts of distributed and parallel operating inter-RAT (3G/LTE) MRO algorithm is as following:

Each LTE cell sorts its own cell pair specific cost functions (CFs) in ascending order and records the highest CF with the corresponding UMTS cell identifier (see "Highest CF" in FIG. 5). The purpose behind this sorting is to resolve conflicts by prioritizing cell pairs with the highest CF.

Based on exchanged information each group of cell pairs with same neighbor relationships is able to autonomously define the cell pair with highest CF and start the MRO algorithm for that cell pair if it realizes that there is no higher CF among the conflicting cell pairs. Herein, a group of cell pairs is defined as the cell pairs having the same source cell for the respective handover associated with the cell pair. The conflicting cell pairs of the group are still monitoring KPIs and reporting KPI statistics to that node running the MRO algorithm. For a given group of cell pairs the cell pair with the highest CF value is selected to start the cell pair specific MRO algorithm ("MRO active"). All other cell pairs of this group keep monitoring their KPIs and report the results to the MRO-active cell pair. Furthermore, the MRO algorithm is simultaneously carried out on all other cell pairs which are not conflicting. For the example in FIG. 5, the cell pairs 21/69 and 20/56 can render the MRO algorithm provided the CF 4 was the highest of the group [{20|56, CF4}, {19|56, CF5}, {18|56, CF7}].

Although some embodiments refer to a "base station", "RNC", "nodeB", "e-nodeB", etc., it should be understood that each of these references is considered to implicitly disclose a respective reference to the general term "control apparatus". Also other terms which relate to specific standards or specific communication techniques are considered to implicitly disclose the respective general term with the desired functionality.

It should further be noted that a network apparatus or a network node as disclosed herein are not limited to dedicated entities as described in some embodiments. Rather, the herein disclosed subject matter may be implemented in various ways in various locations in the communication network while still providing the desired functionality described herein.

According to embodiments of the herein disclosed subject matter, any suitable apparatus (e.g. components, units and devices) disclosed herein, e.g. the control unit 113 are at least in part provided in the form of respective computer programs which enable a processor device to provide the functionality of the respective entities as disclosed herein. According to other embodiments, any suitable apparatus disclosed herein (e.g. the control unit 113) may be provided in hardware. According to other—hybrid—embodiments, some entities may be provided in software while other entities are provided in hardware.

It should be noted that any apparatus disclosed herein (e.g. components, units and devices) are not limited to a dedicated apparatus as described in some embodiments. Rather, the herein disclosed subject matter may be implemented in various ways and with various granularity on device level or software module level while still providing the desired functionality. Further, it should be noted that according to embodiments a separate apparatus (e.g. a software module, a hardware module or a hybrid module) may be provided for each of the functions disclosed herein. According to other embodiments, an apparatus (e.g. a software module, a hardware module or a hybrid module (combined software/hardware module)) is configured for providing two or more functions as disclosed herein. According to an embodiment, the control unit 113 comprises a processor device including at least one processor for carrying out at least one computer program corresponding to a respective software module.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

There is provided a control apparatus for controlling a first cell of a cellular communication network, the control apparatus comprising a control unit configured for receiving handover related data related to a handover from the first cell to a second cell and a third cell, wherein the control unit is further configured for determining a ranking data for the second cell and the third cell, the ranking data being dependent on the handover related data, and wherein the control unit is further configured for setting at least one operating parameter of the control apparatus depending on the handover related data and the ranking data. Further, the control unit may be configured for determining ranking data for the first cell and a fourth cell, and for determining a value for at least one operating parameter of a control apparatus which controls the second cell.

LIST OF REFERENCE SIGNS 100, 200, 500 cellular communication network
102, 102a, 102b cell of a first radio access technology (RAT) (e.g. UMTS)
104, 104a, 104b control apparatus for controlling cell 102
106, 106a, 106b cells of a second RAT (e.g. LTE)
107, 107a, 107b control apparatus for controlling cell 106
108 intra-RAT handover
110 inter-RAT handover from first RAT to second RAT
112 inter-RAT handover from second RAT to first RAT
113 control unit
114a, 114b feedback data
115 storage device
116 ranking data
117 setting value of at least one operating parameter
118a, 118b handover related data/cell pair specific data
120 cell boundary
121 at least one operating parameter value
122 key performance indicator information for handover 110
124 key performance indicator information for handover 112
126 key performance indicator statistics

The invention claimed is:

1. An apparatus comprising:
at least one processor; and
at least one memory including computer program code, the at least one memory and the computer program code configured, with the at least one processor, to cause the apparatus to perform the following:
receiving handover related data, the handover related data including first cell pair specific data related to at least one already performed handover from the first cell to a second cell, and second cell pair specific data related to at least one already performed handover from the first cell to a third cell;
determining a ranking data for the second cell and the third cell, the ranking data being dependent on the handover related data; and
setting at least one operating parameter of the apparatus depending on the handover related data and the ranking data,
wherein the first cell and the second cell are operated with different radio access technologies, wherein the at least one operating parameter includes at least one mobility parameter, the at least one mobility parameter defining a condition for which a handover to a further cell is initiated by the apparatus having set the mobility parameter, wherein cost functions belonging to cell pairs are exchanged between cells forming a cell pair, wherein the apparatus is a control apparatus for controlling a first cell of a cellular communication network, and wherein the control apparatus of the first cell using a radio access technology exchanges only conflict resolving information with the other control apparatuses using the same radio access technology, and wherein the conflict resolving information resolves the conflict occurring upon reception of cell pair specific data of at least two handovers to a second cell and a third cell.

2. The apparatus according to claim 1, wherein the at least one memory and the computer program code are further configured, with the at least one processor, to receive feedback data related to a handover from the first cell to the second cell and to the third cell; and to determine the handover related data on the basis of the feedback data.

3. The apparatus according to claim 2, further comprising a storage device; and wherein the at least one memory and the computer program code are further configured, with the at least one processor, to store the handover related data in the storage device.

4. An apparatus comprising:
at least one processor; and
at least one memory including computer program code, the at least one memory and the computer program code configured, with the at least one processor, to cause the apparatus to perform the following:
receiving handover related data, the handover related data including first cell pair specific data related to at least one already performed handover from a second cell to the first cell, and second cell pair specific data related to at least one already performed handover from the second cell to a third cell;
determining ranking data for the first cell and the third cell from the handover related data; and
determining, depending on the handover related data and the ranking data, a value for at least one operating parameter of a second apparatus controlling the second cell,
wherein the first cell and the second cell are operated with different radio access technologies,
wherein the at least one operating parameter includes at least one mobility parameter, the at least one mobility parameter defining a condition for which a handover to a further cell is initiated by the apparatus having set the mobility parameter,
wherein cost functions belonging to cell pairs are exchanged between cells forming a cell pair,
wherein the apparatus is a control apparatus for controlling a first cell of a cellular communication network, and wherein the control apparatus of the first cell using a radio access technology exchanges only conflict resolving information with the other control apparatuses using the same radio access technology, and
wherein the conflict resolving information resolves the conflict occurring upon reception of cell pair specific data of at least two handovers to a second cell and a third cell.

5. The apparatus according to claim 4, further comprising a storage device; and wherein the at least one memory and the computer program code are further configured, with the at least one processor, to receive the first cell pair specific data from the storage device.

6. The apparatus according to claim 5, wherein the at least one memory and the computer program code are further configured, with the at least one processor, to determine the first cell pair specific data from data related to the at least one handover from the second cell to the first cell; and to store the first cell pair specific data in the storage device.

7. The apparatus according to claim 4, wherein the at least one memory and the computer program code are further configured, with the at least one processor, to receive the second cell pair specific data from a control apparatus controlling the third cell.

8. The apparatus according to claim 7, wherein the second cell pair specific data includes the ranking data of the third cell and a cell pair identifier identifying the second cell and the third cell.

9. A method comprising:
receiving handover related data, the handover related data including first cell pair specific data related to at least one already performed handover from the first cell to a second cell, and second cell pair specific data related to at least one already performed handover from the first cell to a third cell;
determining a ranking data for the second cell and the third cell, the ranking data being dependent on the handover related data; and
setting at least one operating parameter of the control apparatus depending on the handover related data and the ranking data,
wherein the first cell and the second cell are operated with different radio access technologies,
wherein the at least one operating parameter includes at least one mobility parameter, the at least one mobility parameter defining a condition for which a handover to a further cell is initiated by an apparatus controlling the second cell;
wherein cost functions belonging to cell pairs are exchanged between cells forming a cell pair,
wherein the method is a method of operating an apparatus controlling a first cell of a cellular communication network, and wherein the control apparatus of the first cell using a radio access technology exchanges only conflict resolving information with the other control apparatuses using the same radio access technology, and
wherein the conflict resolving information resolves the conflict occurring upon reception of cell pair specific data of at least two handovers to a second cell and a third cell.

10. A method comprising:
receiving handover related data, the handover related data including first cell pair specific data related to at least one already performed handover from a second cell to the first cell, and second cell pair specific data related to at least one already performed handover from the second cell to a third cell;
determining ranking data for the first cell and the third cell from the handover related data; and
depending on the handover related data and the ranking data, determining a value for at least one operating parameter of an apparatus controlling the second cell,
wherein the first cell and the second cell are operated with different radio access technologies,
wherein the at least one operating parameter includes at least one mobility parameter, the at least one mobility parameter defining a condition for which a handover to a further cell is initiated by the apparatus controlling the second cell;

wherein cost functions belonging to cell pairs are exchanged between cells forming a cell pair, and wherein the method is a method of operating an apparatus controlling a first cell of a cellular communication network, and wherein the control apparatus of the first cell using a radio access technology exchanges only conflict resolving information with the other control apparatuses using the same radio access technology, and wherein the conflict resolving information resolves the conflict occurring upon reception of cell pair specific data of at least two handovers to a second cell and a third cell.

11. A computer program product comprising a non-transitory computer readable storage medium bearing computer program code embodied therein for use with a computer, the computer program code comprising code for performing the method as set forth in claim 9.

12. A computer program product comprising a non-transitory computer readable storage medium bearing computer program code embodied therein for use with a computer, the computer program code comprising code for performing the method as set forth in claim 10.

* * * * *